(12) United States Patent
Oguri

(10) Patent No.: US 6,510,645 B2
(45) Date of Patent: Jan. 28, 2003

(54) FISHING ROD

(75) Inventor: Hajime Oguri, Joyo (JP)

(73) Assignee: Water House Co., Ltd., Joyo (JP)

( * ) Notice: Subject to any disclaimer, the term of this patent is extended or adjusted under 35 U.S.C. 154(b) by 0 days.

(21) Appl. No.: 09/749,460

(22) Filed: Dec. 28, 2000

(65) Prior Publication Data

US 2002/0002789 A1 Jan. 10, 2002

(30) Foreign Application Priority Data

Jul. 7, 2000 (JP) ........................................ 2000-206191

(51) Int. Cl.[7] .......................... A01K 87/00; A01K 87/06
(52) U.S. Cl. ................ 43/20; 43/18.1; 43/22; 43/23
(58) Field of Search ............... 43/18.1, 20, 22, 43/23

(56) References Cited

U.S. PATENT DOCUMENTS

| | | | | |
|---|---|---|---|---|
| 4,019,693 A | * | 4/1977 | Lesage | 242/229 |
| 4,398,369 A | * | 8/1983 | Wiebe | 43/18.1 |
| 4,516,351 A | * | 5/1985 | Highby | 43/23 |
| 4,631,853 A | * | 12/1986 | Brackett et al. | 43/23 |
| 4,644,680 A | * | 2/1987 | Dawson | 43/18.1 |
| 4,653,217 A | * | 3/1987 | Ohmura | 43/20 |
| 5,291,684 A | * | 3/1994 | Oyama | 43/23 |
| 5,369,904 A | * | 12/1994 | Vogts et al. | 43/18.1 |
| 5,528,848 A | * | 6/1996 | Myojo et al. | 43/24 |
| 5,632,111 A | * | 5/1997 | Takizawa | 43/20 |
| 5,890,313 A | * | 4/1999 | Collins | 43/20 |
| 6,000,164 A | * | 12/1999 | Maeda | 43/18.1 |
| 6,061,946 A | * | 5/2000 | Toelken | 43/17.5 |
| 6,286,244 B1 | * | 9/2001 | Weiss | 43/18.1 |

* cited by examiner

Primary Examiner—Charles T. Jordan
Assistant Examiner—Tara M Golba
(74) Attorney, Agent, or Firm—Armstrong, Westerman & Hattori, LLP

(57) ABSTRACT

A fishing rod comprises a hollow tubular body having first and second open end portions. The fishing rod further comprises a first member provided at the first open end portion of the tubular body and a second member provided at the second open end portion of the tubular body. A rod blank extends through the first member and the tubular body and terminates at a terminal portion which is disposed in the second member. The rod blank is fixed to the first member and elastically suspended by the second member. An air gap is formed around the rod blank in the tubular body so that a vibration is generated on the rod blank by a strike and transmitted along the rod blank to pass through the first member and reach the terminal portion of the rod blank. The vibration is then reflected from the terminal portion of the rod blank and transmitted along the rod blank reversely toward the first member to be amplified by a resonance. The first member receives the vibration amplified by the resonance.

6 Claims, 1 Drawing Sheet

FISHING ROD

FIELD OF THE INVENTION

The invention relates to a fishing rod for fishing in the sea, river or lake.

PRIOR ART

It is usual on fishing in the sea, river or lake that a vibration is generated on a fishing rod by a strike. However, the vibration is not always a great one. It is frequent that the vibration is too small to sense the strike. A player can therefore not be quick in action in response to the strike, failing to obtain a good result.

It is therefore an object of the invention to provide an improved high performance fishing rod which is convenient and reliable to sense a strike.

SUMMARY OF THE INVENTION

According to the invention, the fishing rod comprises a hollow tubular body having first and second open end portions. The fishing rod further comprises a first member provided at the first open end portion of the tubular body and a second member provided at the second open end portion of the tubular body. A rod blank extends through the first member and the tubular body and terminates at a terminal portion which is disposed in the second member. The rod blank is fixed to the first member and elastically suspended by the second member. An air gap is formed around the rod blank in the tubular body so that a vibration is generated on the rod blank by a strike and transmitted along the rod blank to pass through the first member and reach the terminal portion of the rod blank. The vibration is then reflected from the terminal portion of the rod blank and transmitted along the rod blank reversely toward the first member to be amplified by a resonance. The first member receives the vibration amplified by the resonance.

In a preferred embodiment, the first member comprises a grip head and a sleeve. The grip head is cap-shaped and made of metal. The sleeve is also made of metal. The rod blank is fitted into the sleeve to be fixed to the sleeve. The sleeve is covered by the grip head.

The tubular body comprises a reel seat made of metal. The sleeve is fitted into and fixed to the first open end portion of the reel seat which is covered by the grip head.

It is preferable that the grip head, the sleeve and the reel seat are made of duralumin.

It is also preferable that the second member comprises a grip body made of cork, sponge or wood. The grip body is fixed to the second open end portion of the reel seat. The rod blank is inserted into the grip body to be elastically suspended by the grip body.

In addition, it is preferable that the rod blank is made of graphite.

DETAILED DESCRIPTION OF THE PREFERRED EMBODIMENT

Figure 1:
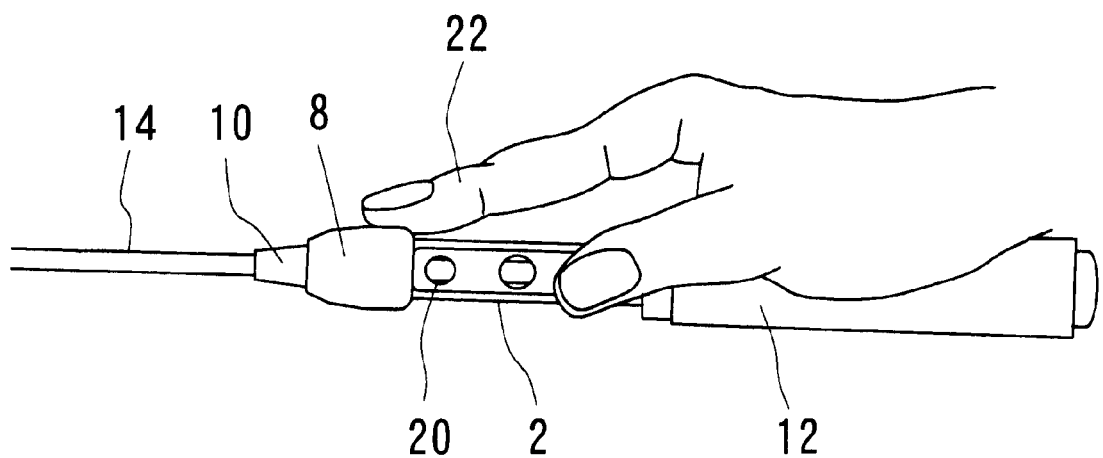
FIG. 1 is a side view of a preferred embodiment of the invention.
Figure 2:
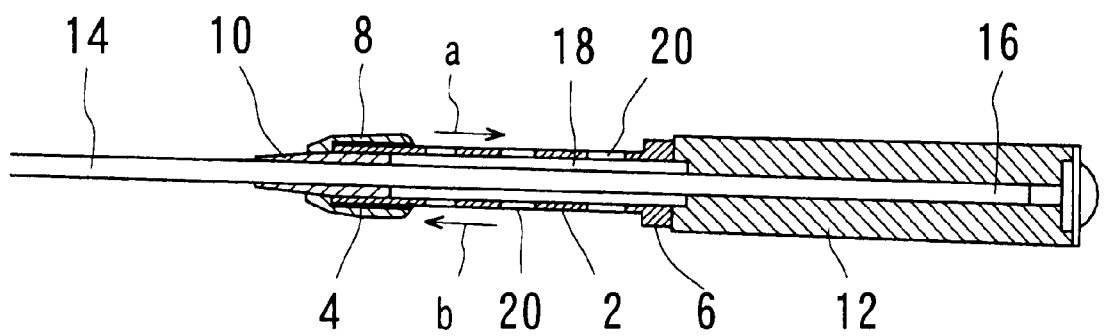
FIG. 2 is a sectional view of the fishing rod of FIG. 1.

Referring now to the drawings, FIG. 1 illustrates a fishing rod for fishing in the sea, river or lake, according to the invention. The fishing rod comprises a hollow tubular body 2 having first and second open end portions 4 and 6, as shown in FIG. 2. The tubular body 2 may be cylindrical or rectangular. The fishing rod further comprises a first member 8 and 10 provided at the first open end portion 4 of the tubular body 2 and a second member 12 provided at the second open end portion 6 of the tubular body 2. A rod blank or shaft 14 extends through the first member 8 and 10 and the tubular body 2 and terminates at the terminal portion 16 which is disposed in the second member 12. The rod blank 14 is fixed to the first member 8 and 10 and elastically suspended by the second member 12. An air gap 18 is formed around the rod blank 14 in the tubular body 2.

The first member comprises a grip head 8 and a sleeve 10. The grip head 8 is cap-shaped and made of metal. The sleeve 10 is also made of metal. In the embodiment, the grip head 8 and the sleeve 10 are made of duralumin. The rod blank 14 is fitted into the sleeve 10 to be fixed to the sleeve 10. The grip head 8 is fitted onto the sleeve 10 so that the sleeve 10 is covered by the grip head 8. The rod blank 14 is hollow and made of graphite.

The tubular body comprises a reel seat 2 made of metal. In the embodiment, the reel seat 2 is made of duralumin. The sleeve 10 is fitted into and fixed to the first open end portion 4 of the reel seat 2 which is covered by the grip head 8. The reel seat 2 includes a plurality of holes 20 formed therein. The fishing rod is combined with a reel, not shown, which is mounted on the reel seat 2. The reel includes a foot portion, the grip head 8 being threadedly engaged with the first open end portion 4 of the reel seat 2 so that the foot portion can be covered and fixed by the grip head 8.

It should therefore be appreciated in the embodiment that the grip head 8 and the sleeve 10 are provided at the first open end portion 4 of the reel seat 2. The rod blank 14 extends through the grip head 8, the sleeve 10 and the reel seat 2, the rod blank 14 being fixed to the sleeve 10 which is fixed to the grip head 8 by means of the first open end portion 4 of the reel seat 2. The air gap 18 is formed around the rod blank 14 in the reel seat 2. The player can observe the air gap 18 through the holes 20.

The second member comprises a grip body 12 made of cork. The grip body 12 is provided at and fixed to the second open end portion 6 of the reel seat 2. The rod blank 14 is inserted into the grip body 12 to be elastically suspended by the grip body 12. It should be understood that the grip body 12 is made of cork to be elastic. The rod blank 14 can therefore be elastically suspended by the grip body 12 when inserted into the grip body 12.

As to the grip head 8 by which the foot portion of the reel is covered and fixed, the grip head 8 is also intended for player's finger 22. The finger 22 can be pressed against the grip head 8 when gripping the grip body 12 and the reel seat 2 in hand after casting, to stabilize the fishing rod.

In the fishing rod, a vibration is generated on the rod blank 14 by a strike. In this connection, it should be recognized that the rod blank 14 is fixed to nothing but the sleeve 10 to be restrained from moving. As to the relationship between the rod blank 14 and the reel seat 2, the rod blank 14 is kept floating in the air gap 18 not to be restrained from moving by the reel seat 2. In addition, as to the relationship between the rod blank 14 and the grip body 12, the rod blank 14 is elastically suspended by the grip body 12 not to be restrained from moving.

Accordingly, the vibration is transmitted along the rod blank 14 to pass through the grip head 8 and the sleeve 10 and reach the terminal end portion 16 of the rod blank 14 as a primary wave "a" in the reel seat 2 and the grip body 12. The vibration is then reflected from the terminal end portion 16 of the rod blank 14 and transmitted along the rod blank 14 reversely toward the grip head 8 and the sleeve 10 as a secondary wave "b". The vibration is therefore amplified by a resonance resulted from the primary and secondary waves "a" and "b". The grip head 8 and the sleeve 10 receives the vibration amplified by the resonance.

Accordingly, even if the vibration is small when generated on the rod blank 14 by the strike, it will be amplified by the resonance and then transmitted to the grip head 8 and the finger 22. The fishing rod is therefore convenient and reliable to sense the strike. The player can be quick in action in response to the strike.

The rod blank 14 is fixed to the sleeve 10 which is fixed to the grip head 8 by means the first open end portion 4 of the reel seat 2, as described above. In this connection, it should be appreciated that the grip head 8, the sleeve 10 and the reel seat 2 are made of metal to make the vibration transmitted easily. In addition, the grip head 8, the sleeve 10 and the reel seat 2 are made of duralumin, as also described above, to obtain a high transmissibility.

The rod blank 14 is hollow and made of graphite, as also described above. This can make the rod blank 14 light, strong and flexible. The rod blank 14 may be solid.

It is not always necessary that the grip body 12 is made of cork. The grip body 12 may be made of sponge or wood. In either case, the rod blank 14 can be elastically suspended by the grip body 12 when inserted into the grip body 12.

What is claimed is:

1. A fishing rod comprising:

a hollow tubular body comprising a reel seat and having first and second open end portions;

a first member made of metal and provided at said first end portion of the tubular body;

a second member provided at said second end portion of the tubular body; and a rod blank extending through said first member and said tubular body and terminating at a terminal portion which is disposed in said second member, said rod blank being brought into direct contact with and fixed to said first member and elastically suspended by said second member to vibrate inside said second member, an air gap being formed around said rod blank in said tubular body, said rod blank extending to said second member from said first member through said air gap without being brought into direct contact with said tubular body between said air gap and said second member so that a vibration is generated on said rod blank by a strike and transmitted along said rod blank to pass through said first member and reach said terminal portion of the rod blank, said vibration being then reflected from said terminal portion of the rod blank and transmitted along said rod blank reversely toward said first member to be amplified by a resonance, said first member receiving said vibration amplified by said resonance to sense the strike by a player's finger pressed against the first member.

2. The fishing rod as set forth in claim 1 wherein said first member comprises a grip head and a sleeve, said grip head being cap-shaped and made of metal, said sleeve being also made of metal, said rod blank being fitted into said sleeve to be fixed to said sleeve, said sleeve being covered by said grip head.

3. The fishing rod as set forth in claim 2 wherein said tubular body comprises a reel seat made of metal, said sleeve being fitted into and fixed to said first open end portion of the reel seat which is covered by said grip head.

4. The fishing rod as set forth in claim 3 wherein said grip head, said sleeve and said reel seat are made of duralumin.

5. The fishing rod as set forth in claim 4 wherein said second member comprises a grip body made of cork, sponge or wood, said grip body being fixed to said second open end portion of the reel seat, said rod blank being inserted into said grip body to be elastically suspended by said grip body.

6. The fishing rod as set forth in any one of claims 1 to 5 wherein said rod blank is made of graphite.

* * * * *